United States Patent
Kamen et al.

[11] Patent Number: 6,062,600
[45] Date of Patent: *May 16, 2000

[54] ANTI-TIPPING MECHANISM

[75] Inventors: Dean L. Kamen, Bedford; Robert Ambrogi, Manchester; Christopher C. Langenfeld, Nashua; Stanley B. Smith, III, Henniker, all of N.H.

[73] Assignee: Deka Products Limited Partnership, Manchester, N.H.

[ * ] Notice: This patent issued on a continued prosecution application filed under 37 CFR 1.53(d), and is subject to the twenty year patent term provisions of 35 U.S.C. 154(a)(2).

[21] Appl. No.: 08/892,566

[22] Filed: Jul. 14, 1997

Related U.S. Application Data

[60] Provisional application No. 60/021,872, Jul. 17, 1996, abandoned.

[51] Int. Cl.⁷ .............................. B60R 21/00; A61G 5/04; B62M 1/14
[52] U.S. Cl. ................... 280/755; 280/763.1; 280/304.1; 280/250.1
[58] Field of Search ................................. 280/755, 763.1, 280/304.1, 298, 304, 6.15, 765.1, 250.1, 764.1, 766.1

[56] References Cited

U.S. PATENT DOCUMENTS

| 2,402,322 | 6/1946 | Flynn, Jr. ................................. 280/755 |
| 3,397,898 | 8/1968 | Denney et al. .......................... 280/755 |
| 3,804,435 | 4/1974 | See et al. ................................. 280/733 |
| 3,848,883 | 11/1974 | Breacain .......................... 280/250.1 X |
| 4,691,798 | 9/1987 | Engelbach ................................. 180/209 |
| 5,294,141 | 3/1994 | Mentessi et al. ..................... 280/250.1 |
| 5,401,055 | 3/1995 | Pham ........................................ 280/755 |
| 5,421,598 | 6/1995 | Robertson et al. ................... 280/250.1 |

FOREIGN PATENT DOCUMENTS

| 6850 | 10/1829 | France ..................................... 280/755 |
| 50975 | 2/1890 | Germany ................................. 280/755 |

*Primary Examiner*—J. J. Swann
*Assistant Examiner*—F. Zeender
*Attorney, Agent, or Firm*—Bromberg & Sunstein LLP

[57] ABSTRACT

An anti-tipping mechanism for a vehicle that provides a strut actively deployed by rotation from a retracted position so as to bring a wheel into ground contact to inhibit tipping of the vehicle.

5 Claims, 8 Drawing Sheets

ANTI-TIPPING MECHANISM

The present application claims priority from U.S. provisional application number 60/021,872, filed Jul 17, 1996, now abandoned, which is herein incorporated by reference.

TECHNICAL FIELD

The present invention pertains to a deployable anti-tipping mechanism, and, in particular, to a deployable anti-tipping mechanism for preventing the overturning of a wheelchair-type vehicle.

BACKGROUND OF THE INVENTION

Vehicles, whether for the transportation of humans or otherwise, may lack stability either by design, where inherent stability is sacrificed in order to achieve relative mobility, or due to the nature of their use. Many such vehicles are particularly susceptible to tipping, whether due to collision, mechanical failure, sudden turns, steep inclines, or an encounter with a surface irregularity for which the mechanism is incapable of compensating. Indeed, any personal vehicle may tip when sufficiently severe surface irregularities are encountered. Under these circumstances, the occupant or contents of the vehicle must be protected so that injury does not result from propulsion of the occupant toward the ground or other solid obstacle. Unless protected, the occupant may also sustain injury due to trauma or crushing if the vehicle, which may be relatively massive, overturns or is propelled, due to its inertia, into a solid obstacle or on top of the occupant. To protect the occupant of the vehicle from injury and the vehicle from damage, the vehicle must be inhibited from tipping over.

One method which has been employed in a wheelchair in order to prevent tipping under conditions of a sudden stop or sudden acceleration involves the placement of a roller or wheel forward of the front axle or aft of the rear axle. The purpose of the fixed roller or wheel is to contact the ground and roll in case the vehicle tips forwards or backwards, thereby inhibiting the vehicle from overturning. The presence of a fixed wheel extended forward of the frame of the vehicle limits the maneuverability of the vehicle by reducing ground clearance and restricting the vehicle's ability to traverse irregular terrain and obstacles. Limited maneuverability is particularly detrimental if the vehicle is a wheelchair. A similar limitation is imposed by a fixed wheel located aft of the rear axle to inhibit backward tilting of the vehicle.

Another anti-tip mechanism which has been applied to a wheelchair in order to prevent rearward tipping involves a pair of wheels mounted aft of the rear axle beneath the undercarriage of the wheelchair on spring-tensioned articulated supports.

SUMMARY OF THE INVENTION

In accordance with an embodiment of the present invention, there is provided an anti-tipping mechanism for a vehicle. The anti-tipping mechanism has a strut which is mounted so as to permit travel about an axis from a retracted position to a deployed position. A wheel is mounted to an end of the strut. The anti-tipping mechanism also has a actuator which rotates the strut from the retracted position to the deployed position.

In accordance with a further embodiment of the invention, the anti-tipping mechanism may have an engagement mechanism for bringing the wheel into ground contact. Additionally, the anti-tipping mechanism may have a sensor for detection a moment of the center of mass about the ground contact and a controller in communication with the sensor for activating the actuator. The sensor may be an inclinometer. The engagement mechanism for bringing the wheel into ground contact may be an arm received into a sleeve in the strut.

The anti-tipping mechanism described herein advantageously provides the capability to deploy a wheel to inhibit the overturning of a vehicle. An additional advantage of the present invention is to provide an anti-tipping mechanism which does not impede the maneuverability of the vehicle when the anti-tipping mechanism is retracted and not deployed. Other objects and advantages of the invention are in part apparent and in part pointed out hereinafter.

BRIEF DESCRIPTION OF THE DRAWINGS

The invention will be more readily understood by reference to the following description, taken with the accompanying drawings, in which.

DETAILED DESCRIPTION OF THE PREFERRED EMBODIMENT

Figure 1:
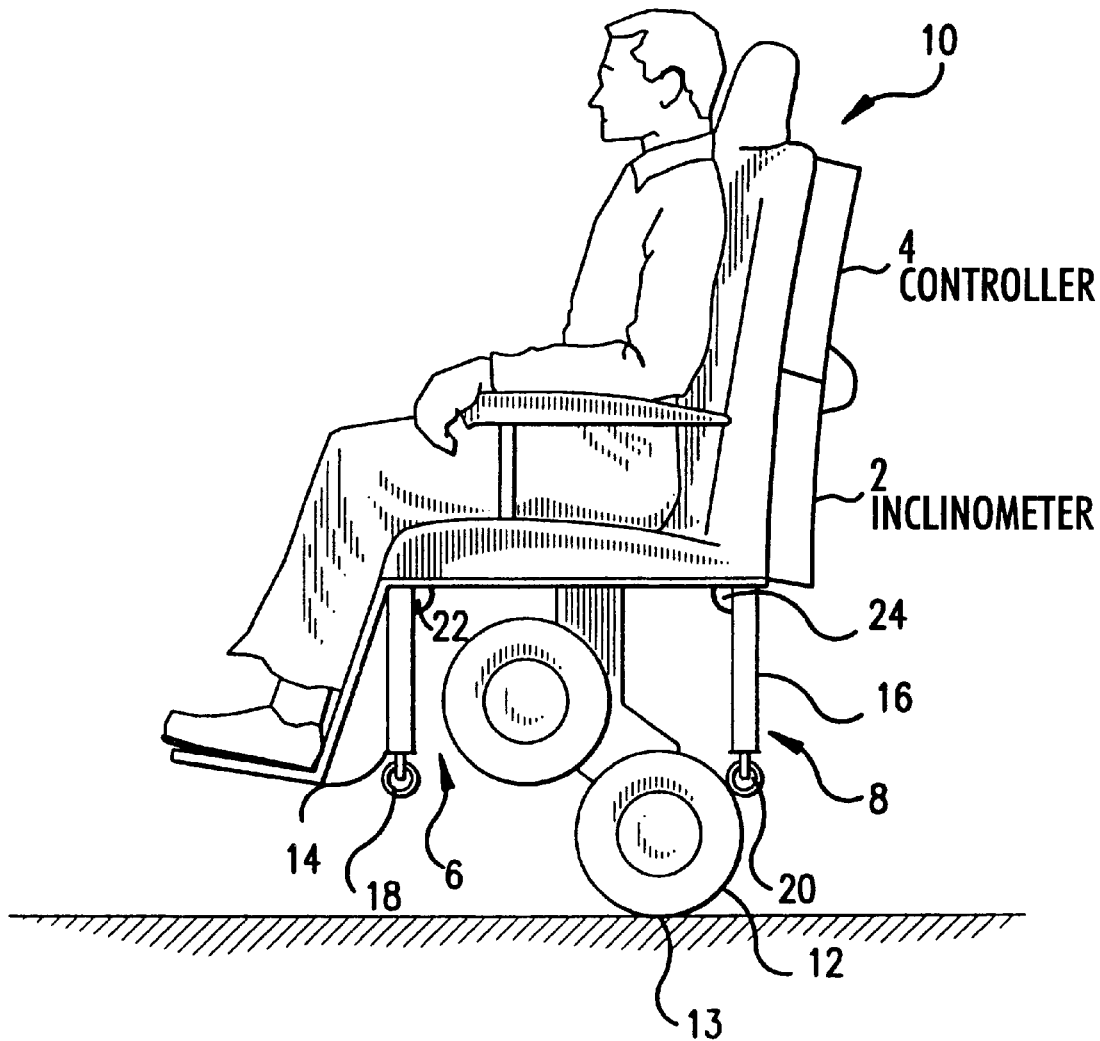
FIG. 1 is a side view of a wheelchair-type vehicle employing an embodiment of the invention wherein two anti-tipping mechanisms are shown in a retracted position.

Referring now to FIGS. 1 through 4, wherein a side-view is shown of a wheelchair-type vehicle, designated generally by numeral 10, in progressive stages of a forward-tipping motion. An example of such a vehicle is described in U.S. Pat. No. 5,701,965, issued Dec. 30, 1997, from U.S. patent application, Ser. No. 08/250,693, filed May 27, 1994 for an invention by Kamen et al. Referring, particularly, to FIG. 1, vehicle 10 is shown supported on a pair of laterally disposed wheels 12 which provide ground contact for vehicle 10. The anti-tipping mechanism which is the subject of the present invention is embodied in each of the forward-facing anti-tippers designated generally by numeral 6 and rear-facing anti-tippers designated generally by numeral 8. In the preferred embodiment, two forward-facing anti-tippers 6 and two rear-facing anti-tippers 8 are attached to vehicle 10. In alternate embodiments, a larger or smaller number of anti-tippers may be provided. Struts 14 of anti-tippers 6 and struts 16 of anti-tippers 8 are attached to vehicle 10 so as to be rotatable about an axis in a direction which has a vector component parallel to the direction of motion of the vehicle. In the preferred embodiment, struts 14 of anti-tippers 6 and struts 16 of anti-tippers 8 are attached to vehicle 10 so as also to be rotatable in a direction which is perpendicular to the direction of motion of the vehicle. Within the scope of the invention and the appended claims, anti-tippers 6 may also operate entirely in a direction lateral to the direction of motion of the vehicle.

In FIG. 1, struts 14 and 16 are shown in a retracted position, extending neither forward nor aft of vehicle 10. The retracted position is shown to be substantially vertical only by way of example and may be slanted either fore or aft of the position shown. In the preferred embodiment, struts 14 are actively deployed by actuators 22 and 24 if an impending tip by vehicle 10 is sensed and the tip cannot otherwise be compensated by means available on vehicle 10. By way of example, actuators 22 and 24 may utilize energy stored in a spring (not shown), and may also utilize any means known in the art for rotating struts 14 in advance of tipping vehicle 10. The sensing of tilt is accomplished by one of the means known in the art, such as sensing rotation of wheels 12 with respect to vehicle 10 or by means of an inclinometer 2 or other sensor for detecting a moment of the center of mass about point 13 of ground contact. In response to a sensed tilt, a controller 4 such as a microprocessor activates actuators 22 or 24 to deploy struts 14 or 16. Wheels 18 and 20 are attached to struts 14 distally to actuators 22 and 24 such that when contact is made with the ground at a point forward of wheels 12 it is made by wheels 18, and when contact is made with the ground at a point aft of wheels 12 it is made by wheels 20.

Figure 2:
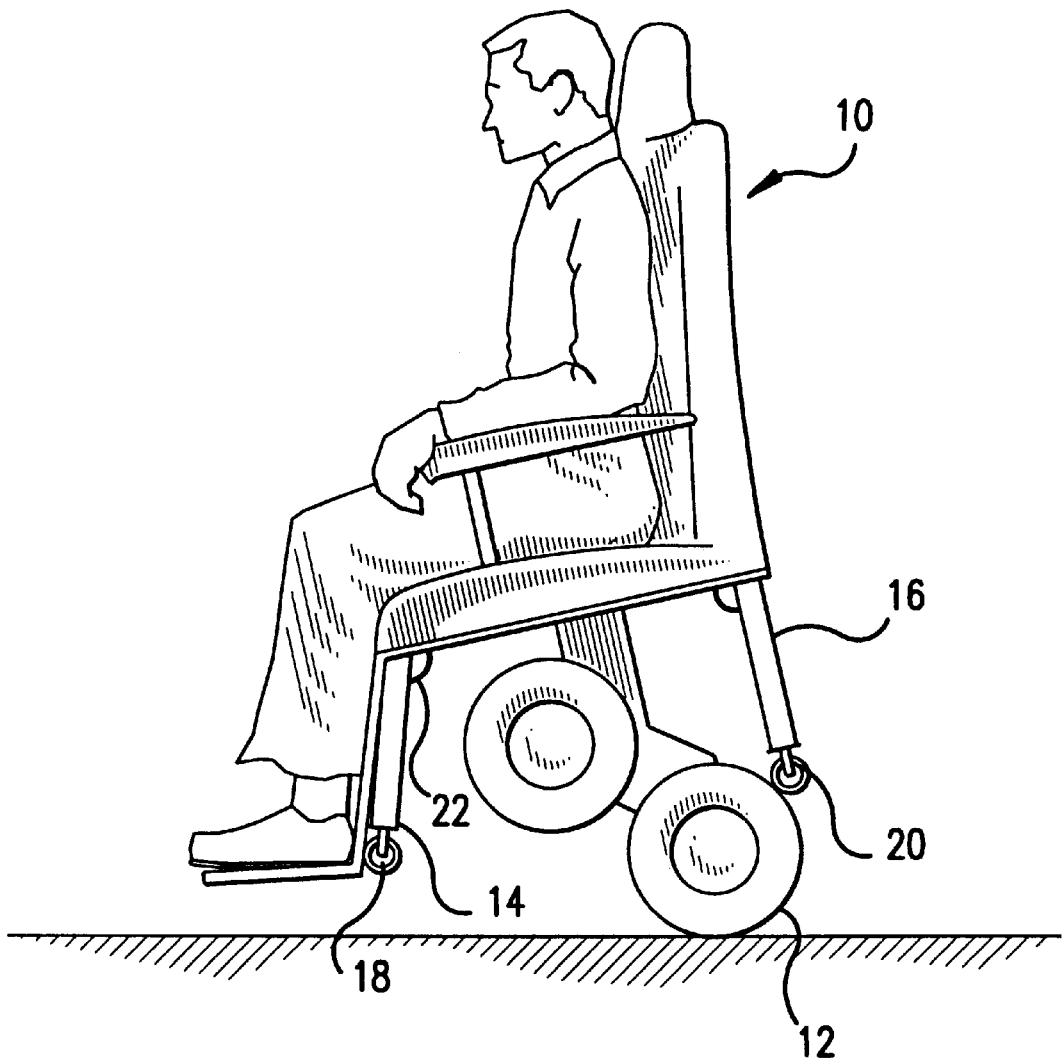
FIG. 2 is a side view of the wheelchair-type vehicle of FIG. 1 wherein one anti-tipping mechanism is shown in a partially deployed forward-facing position.
Figure 3:
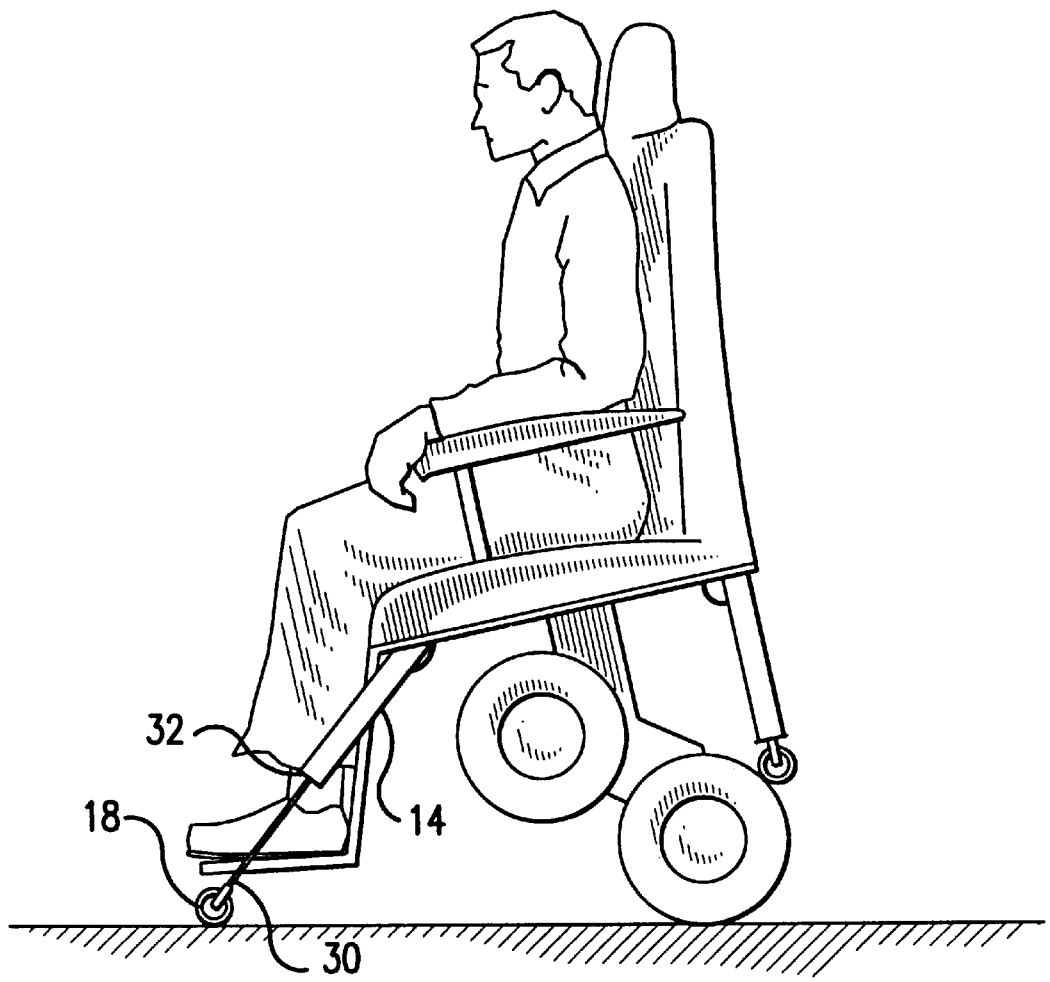
FIG. 3 is a side view of the wheelchair-type vehicle of FIG. 1 wherein one anti-tipping mechanism is shown in a partially deployed and partially extended forward-facing position.
Figure 4:
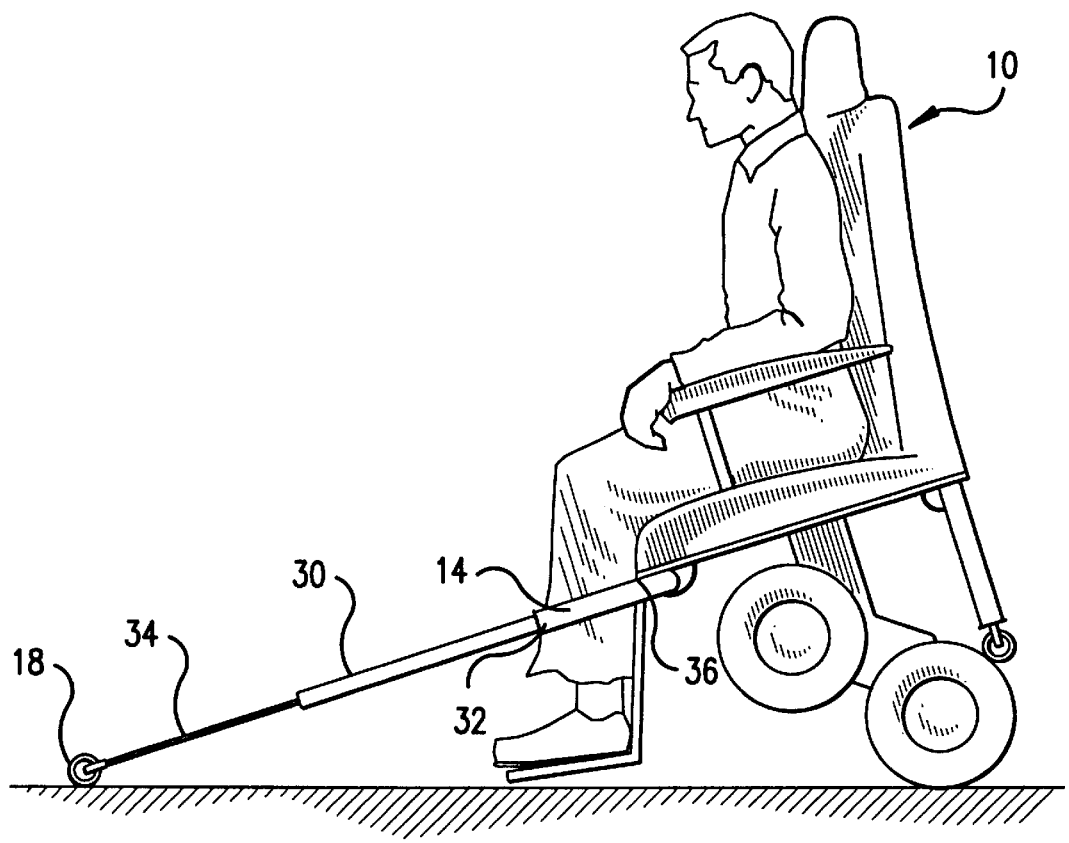
FIG. 4 is a side view of the wheelchair-type vehicle of FIG. 1 wherein one anti-tipping mechanism is shown in a fully deployed and fully extended forward-facing position.
Figure 5:
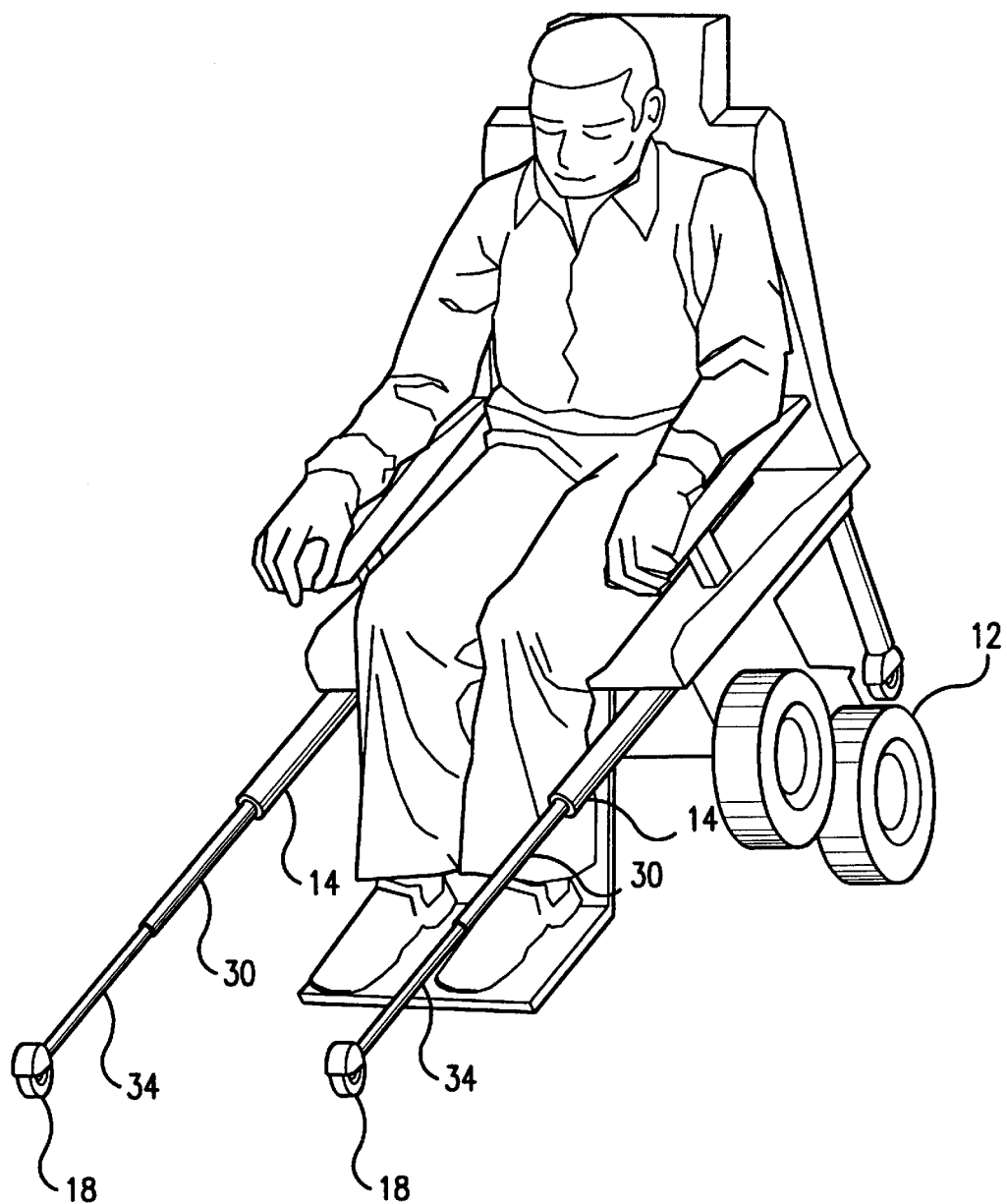
FIG. 5 is a front perspective view of the wheelchair-type vehicle of FIG. 1 wherein one anti-tipping mechanism is shown in a fully deployed and partially extended backward-facing position.

Referring now to FIG. 2, vehicle 10 is shown in the initial stage of a forward tilt. In response to the forward tilt, actuator 22 is shown to have begun to deploy struts 14 by propelling struts 14 in substantially forward rotation. Further tipping of vehicle 10 is shown in FIG. 3, accompanied by further forward deployment of strut 14. Additionally, an extendable member 30 has been projected out of sleeve 32 by an engagement mechanism (not shown) which is contained within strut 14. Projection of extendable member 30 out of sleeve 32 is accomplished by any means known in the art for projection of a concentric member such as by employing energy stored in a spring (not shown). Projection of extendable member 30 provides for ground contact of wheel 18 so that vehicle 10 may continue to roll and tipping is inhibited. After wheel 18 comes into contact with the ground, strut 14 may continue to rotate forward. In the preferred embodiment, a plurality of extendable members 30 and 34 are projected successively, as shown in FIG. 4. Referring further to FIG. 4, strut 14 is shown in a fully deployed position, with further forward rotation inhibited by stop 36. Additionally, extendable members 30 and 34 are shown fully projected such that further tipping of vehicle 10 is prevented. Referring to FIG. 5, the fully deployed position of struts 14 is shown in front view, along with fully projected extendable members 30 and 34.

Figure 6:
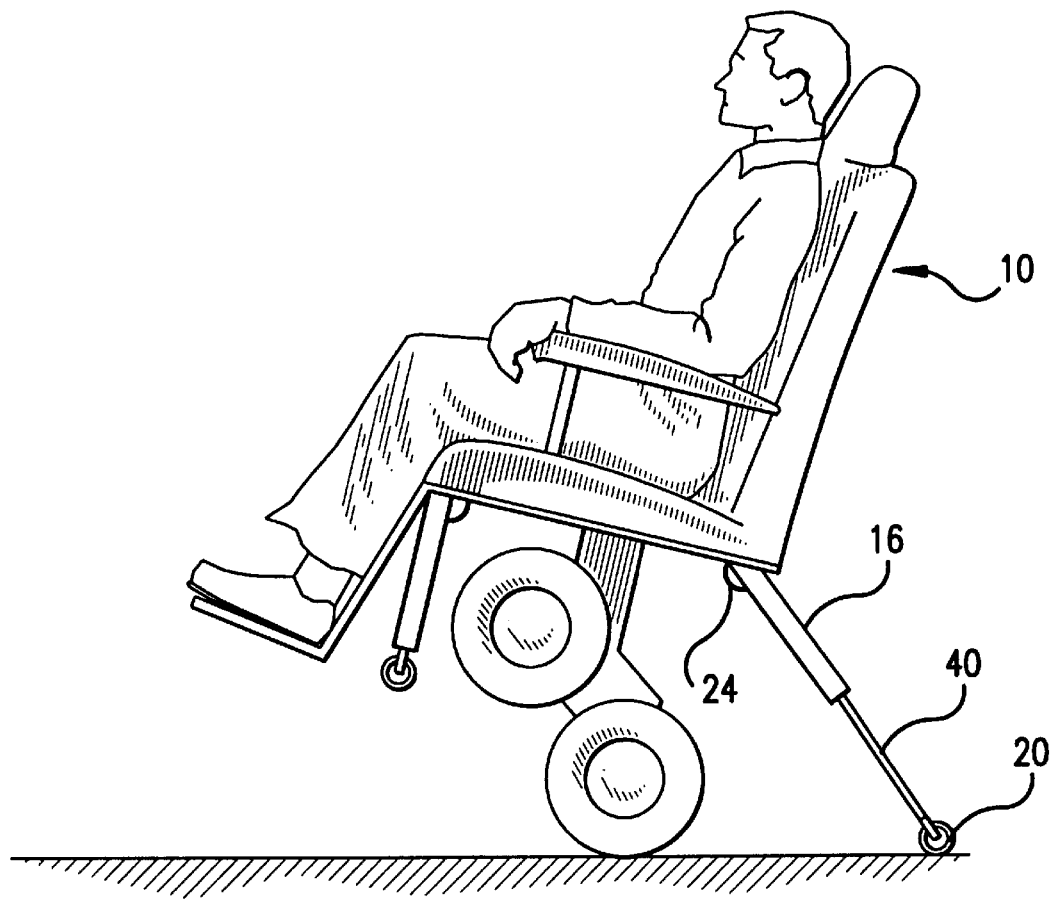
FIG. 6 is a side view of the wheelchair-type vehicle of FIG. 1 wherein one anti-tipping mechanism is shown in a partially deployed and partially extended backward-facing position.
Figure 7:
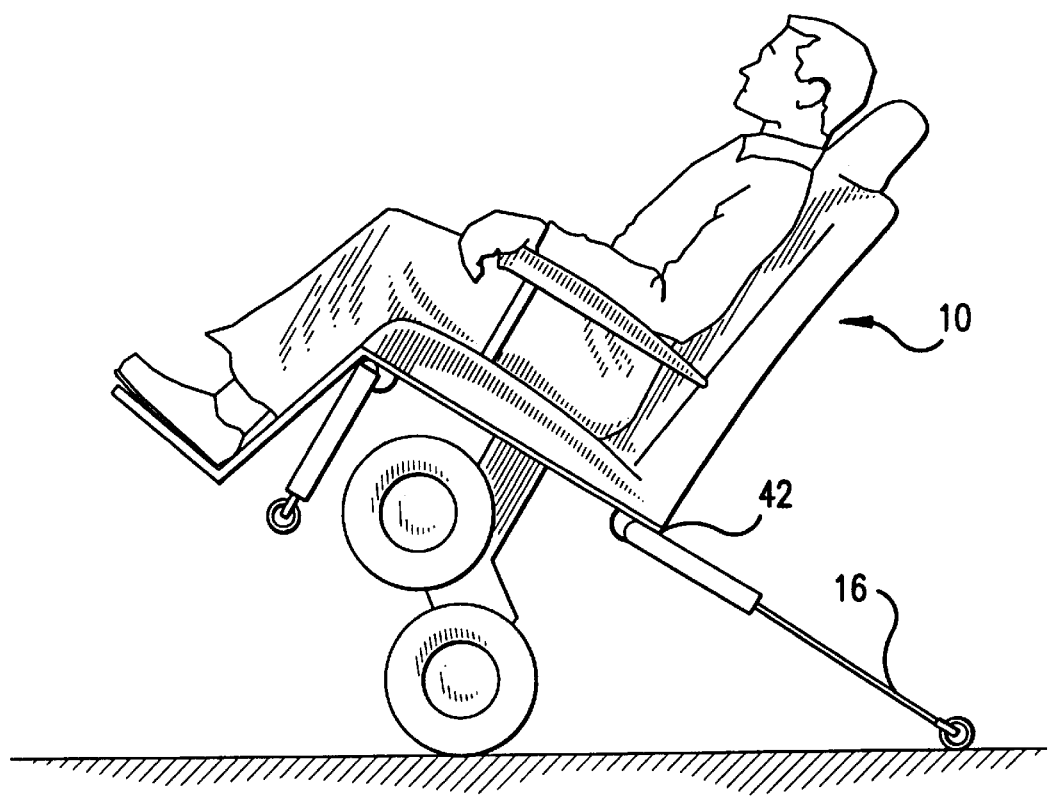
FIG. 7 is a side view of the wheelchair-type vehicle of FIG. 1 wherein one anti-tipping mechanism is shown in a fully deployed and fully extended backward-facing position.
Figure 8:
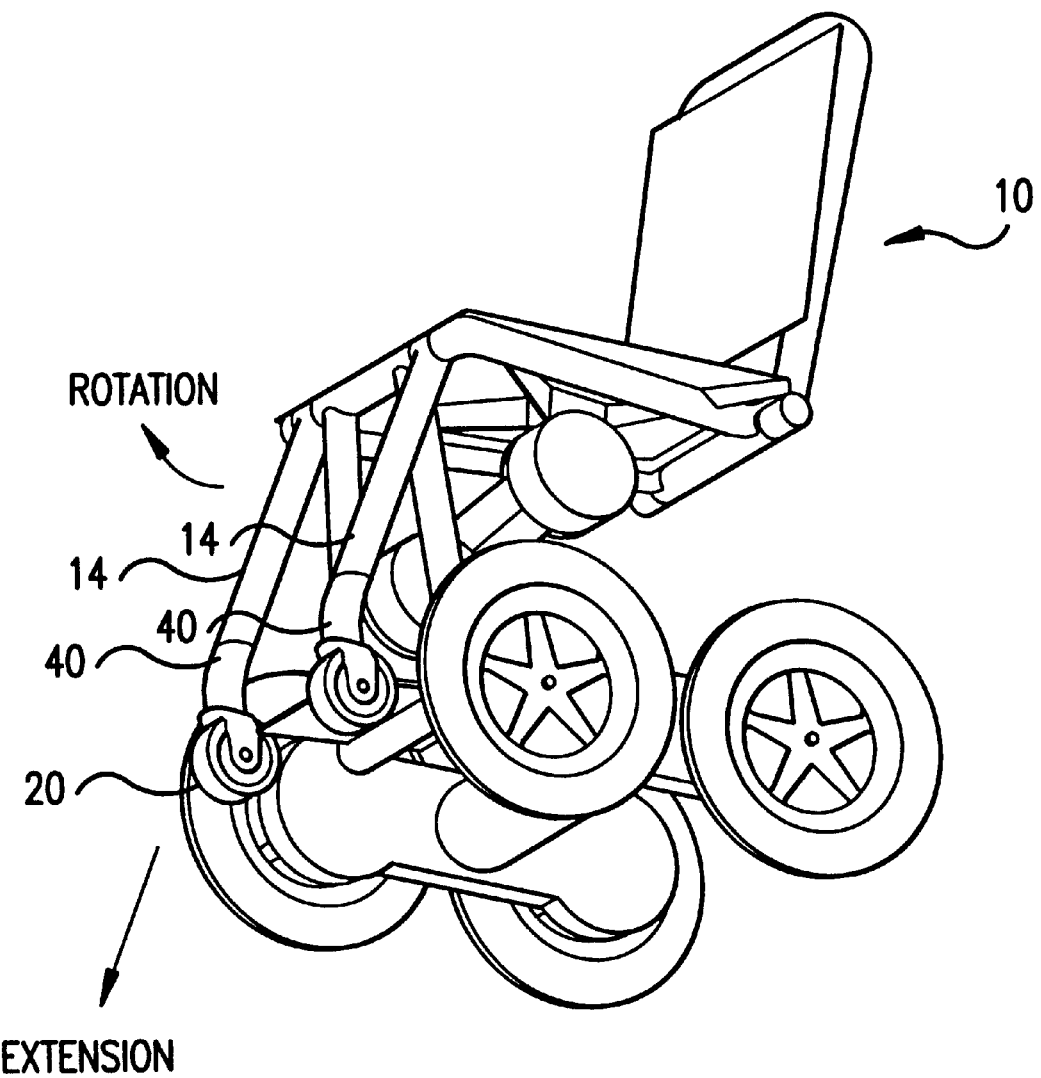
FIG. 8 is a bottom perspective view of a wheelchair-type vehicle employing an alternative embodiment of the invention wherein an anti-tipping mechanism is shown in a partially deployed and partially extended forward-facing position.

Referring now to FIG. 6, vehicle 10 is shown tipping in a backwards direction, with strut 16 in the process of rearward deployment and extendable member 40 projected to bring wheel 20 into ground contact to initiate rolling of wheel 20. Projection of extendable member 40 provides for ground contact of wheel 20 so that vehicle 10 may continue to roll and tipping is inhibited. Actuation of actuator 24 in response to tipping of vehicle 10 is in a manner analogous to that described with respect to strut 14 in reference to FIGS. 1–5. In FIG. 7, strut 16 is shown fully deployed, with further rotation inhibited by stop 42. FIG. 8 shows an alternative embodiment of the invention as implemented on a wheelchair-type vehicle 10, indicating struts 14, extendable members 40 and wheels 20.

The described embodiments of the invention are intended to be merely exemplary and numerous variations and modifications will be apparent to those skilled in the art. All such variations and modifications are intended to be within the scope of the present invention as defined in the appended claims.

We claim:

1. An anti-tipping vehicle, the vehicle characterized by a center of mass and a direction of travel, the vehicle comprising:

a. a frame;

b. a pair of wheels rotating in laterally spaced planes, the pair of wheels dynamically maintaining stability of the vehicle with respect to fore-aft tipping during normal operation;

c. a strut coupled to the frame in such a manner as to permit rotation of the strut from a retracted position to a deployed position about an axis, the axis having a component perpendicular to the direction of travel of the vehicle;

d. a wheel mounted to an end of the strut;

e. a sensor responsive to motion of the center of mass in one of a forward and backward direction;

f. an actuator for rotating the strut from the retracted position to the deployed position; and g. a controller, in communication with the sensor, for activating the actuator in response to a specified motion of the center of mass in one of the forward and backward directions.

2. An anti-tipping mechanism according to claim 1, further comprising an engagement mechanism for bringing the wheel mounted to the end of the strut into ground contact.

3. An anti-tipping mechanism according to claim 2, wherein the engagement mechanism is provided by an extendable member coupled to said strut.

4. An anti-tipping mechanism according to claim 2, wherein said extendable member is an arm received into a sleeve in said strut.

5. An anti-tipping mechanism according to claim 1, wherein the sensor is an inclinometer.

* * * * *

UNITED STATES PATENT AND TRADEMARK OFFICE
CERTIFICATE OF CORRECTION

PATENT NO.    : 6,062,600                                         Page 1 of 1
DATED         : May 16, 2000
INVENTOR(S)   : Dean L. Kamen et al.

It is certified that error appears in the above-identified patent and that said Letters Patent is hereby corrected as shown below:

<u>Column 4,</u>
Line 54, replace "claim 2" with -- claim 3 --.
Lines 47, 51, 54 and 57, replace "mechanism" with -- vehicle --.

Signed and Sealed this

Second Day of December, 2003

JAMES E. ROGAN
*Director of the United States Patent and Trademark Office*